(12) United States Patent
Osa et al.

(10) Patent No.: US 12,545,151 B2
(45) Date of Patent: Feb. 10, 2026

(54) VEHICLE SEAT

(71) Applicant: NHK SPRING CO., LTD., Yokohama (JP)

(72) Inventors: Shunichiro Osa, Yokohama (JP); Pham Quoc Trieu, Yokohama (JP)

(73) Assignee: NHK Spring Co., Ltd., Yokohama (JP)

( * ) Notice: Subject to any disclaimer, the term of this patent is extended or adjusted under 35 U.S.C. 154(b) by 185 days.

(21) Appl. No.: 18/486,862

(22) Filed: Oct. 13, 2023

(65) Prior Publication Data

US 2024/0123875 A1 Apr. 18, 2024

(30) Foreign Application Priority Data

Oct. 18, 2022 (JP) .................................. 2022-166947

(51) Int. Cl.
*B60N 2/30* (2006.01)
*B60N 2/20* (2006.01)
*B60N 2/10* (2006.01)

(52) U.S. Cl.
CPC ................ *B60N 2/20* (2013.01); *B60N 2/10* (2013.01); *B60N 2/3011* (2013.01); *B60N 2/3013* (2013.01); *B60N 2/3065* (2013.01)

(58) Field of Classification Search
CPC .. B60N 2/3013; B60N 2/3065; B60N 2/3011; B60N 2/10; B60N 2/20
See application file for complete search history.

(56) References Cited

U.S. PATENT DOCUMENTS

| | | | | |
|---|---|---|---|---|
| 3,333,885 | A * | 8/1967 | Franke | B60N 2/36 296/66 |
| 6,030,042 | A * | 2/2000 | Bauer | B60N 2/20 297/340 |
| 6,345,867 | B1 * | 2/2002 | Hellrung | B60N 2/20 297/378.12 |
| 9,403,447 | B2 * | 8/2016 | Elton | B60N 2/3011 |
| 10,518,663 | B1 * | 12/2019 | Kakishima | B60N 2/0155 |
| 10,843,599 | B2 * | 11/2020 | Arico | B60N 2/3093 |
| 11,554,688 | B2 * | 1/2023 | Williams | B60N 2/0244 |
| 2011/0074199 | A1 * | 3/2011 | Sprenger | B60N 2/206 297/361.1 |
| 2016/0039316 | A1 * | 2/2016 | Dill | B60N 2/3065 297/361.1 |
| 2018/0281688 | A1 | 10/2018 | Matsunami et al. | |

FOREIGN PATENT DOCUMENTS

JP 2018-176765 A 11/2018

* cited by examiner

*Primary Examiner* — Syed A Islam
(74) *Attorney, Agent, or Firm* — Knobbe, Martens, Olson & Bear, LLP

(57) ABSTRACT

A vehicle seat including: a seat back that is tiltable forward around a reclining rod; a support rod that extends along the seat width direction and is supported at a support member that is attached to a vehicle body floor part; and a coupling mechanism that couples the support rod with the reclining rod, the coupling mechanism is configured to attain: a first coupling state that is a coupling state when the seat back is at a position supporting the back area of the seated vehicle occupant, and a second coupling state that is a coupling state when the seat back is tilted forward and a rear face of the seat back is made horizontal, a distance from the support rod to the reclining rod in a seat side view is longer in the second coupling state than in the first coupling state.

4 Claims, 11 Drawing Sheets

VEHICLE SEAT

CROSS-REFERENCE TO RELATED APPLICATION

This application is based on and claims priority under 35 USC 119 from Japanese Patent Application No. 2022-166947, filed on Oct. 18, 2022, the entire disclosure of which is incorporated by reference herein.

BACKGROUND

Technical Field

The present disclosure relates to a vehicle seat.

Related Art

Japanese Patent Application Laid-Open (JP-A) No. 2018-176765 discloses a technology relating to a vehicle seat, a seat back of which can be tilted forward. To describe this conventional technology briefly, the seat back may tilt forward, to a side thereof at which an upper face portion of a seat cushion is disposed, by being rotated to a front-lower side around a central portion of a recliner.

However, in this structure, depending on the shape of a front face side of the seat back and the shape of the upper face side of the seat cushion, when the seat back is tilted forward and overlaid on the seat cushion, it may not be possible to dispose a rear face side of the seat back horizontally.

SUMMARY

The present disclosure provides a vehicle seat in which a rear face side of a seat back may be disposed horizontally when the seat back is tilted forward.

A vehicle seat according to a first aspect of the present disclosure includes: a seat cushion; a seat back for supporting a back area of a vehicle occupant seated on the seat cushion, the seat back being tiltable forward, around a reclining rod that extends along a seat width direction; a support rod that extends along the seat width direction, the support rod being supported at a support member that is attached to a vehicle body floor part; and a coupling mechanism that couples the support rod with the reclining rod, the coupling mechanism being configured to attain a first coupling state and a second coupling state, the first coupling state being a coupling state when the seat back is at a position supporting the back area of the seated vehicle occupant, and the second coupling state being a coupling state when the seat back is tilted forward and a rear face of the seat back is made horizontal, a distance from the support rod to the reclining rod in a seat side view being longer in the second coupling state than in the first coupling state.

According to the structure described above, the seat back is for support of the back area of a vehicle occupant seated on the seat cushion. The seat back may be tilted forward by turning around the reclining rod that extends along the seat width direction. The support rod that extends along the seat width direction is supported at the support member attached to the vehicle body floor part. The support rod and the reclining rod are coupled by the coupling mechanism. This coupling mechanism is configured to attain the first coupling state and the second coupling state. The first coupling state is the coupling state when the seat back is at the position that supports the back area of the seated vehicle occupant. The second coupling state is the coupling state when the seat back is tilted forward and the rear face of the seat back is made horizontal. In a seat side view of the second coupling state, a distance from the support rod to the reclining rod is longer than in the first coupling state. Therefore, the seat back may be tilted forward such that the position of the reclining rod is lifted and the rear face of the seat back is horizontal.

In a vehicle seat according to a second aspect of the present disclosure, in the structure of the first aspect, the coupling mechanism includes: a first link member, a proximal end portion of which is turnably coupled to the support member via the support rod; and a second link member that is coupled to a distal end portion of the first link member to be turnable around an axis in the seat width direction and that is turnably coupled to a seat back frame of the seat back via the reclining rod.

According to the structure described above, the coupling mechanism includes the first link member and the second link member. The proximal end portion of the first link member is turnably coupled to the support member via the support rod. The second link member is coupled to the distal end portion of the first link member to be turnable around the axis in the seat width direction, in addition to which the second link member is turnably coupled to the seat back frame of the seat back via the reclining rod. Therefore, even with a simple structure, the coupling mechanism may attain the first coupling state and the second coupling state.

In a vehicle seat according to a third aspect of the present disclosure, in the structure of the second aspect: the seat back frame includes a frame main body and a bracket that is attached to a lower end portion side of the frame main body, the reclining rod being attached to the bracket; and an abutting member is attached to the bracket, the abutting member extending in the seat width direction and, when the seat back is turned in a direction of tilting forward, the abutting member abutting against the second link member partway through turning of the seat back.

According to the structure described above, the reclining rod and the abutting member are attached to the bracket that is attached to the frame main body of the seat back frame. The abutting member extends in the seat width direction. When the seat back is turned in the direction of tilting forward, the abutting member abuts against the second link member partway through this rotation. Therefore, when a vehicle occupant rotates the seat back in the direction of tilting forward, the abutting member may press against the second link member, making it easier for the coupling mechanism to attain the second coupling state.

In a vehicle seat according to a fourth aspect of the present disclosure, in the structure of the third aspect, an incision portion is formed in a region of a seat front-rear direction front side of the second link member, the incision portion being incised from the front side in the seat front-rear direction in a seat side view; and the incision portion is formed such that, partway through turning of the seat back when the seat back is turned in the direction of tilting forward, the abutting member abuts against the incision portion from the front side in the seat front-rear direction and the upper side in a seat vertical direction.

According to the structure described above, when the seat back is turned in the direction of tilting forward, partway through turning of the seat back, the abutting member abuts against the incision portion of the second link member from the front side in the seat front-rear direction and the upper side in the seat vertical direction. Therefore, when the side of the seat back at which the reclining rod is disposed acts to lift upward while a vehicle occupant is turning the seat back in the direction of tilting forward, the abutting member may receive a reaction force toward the seat upper side from the second link member. Therefore, the vehicle occupant may lift up the side of the seat back at which the reclining rod is disposed with a small force.

In a vehicle seat according to a fifth aspect of the present disclosure, in the structure of the second aspect, an inflected piece is formed at a lower portion of the second link member, which inflected piece: is inflected toward the seat width direction from a front end side of the lower portion of the second link member; is disposed at the front side in the seat front-rear direction relative to the distal end portion of the first link member; and, when the coupling mechanism is in the second coupling state, abuts against the distal end portion of the first link member and limits turning of the second link member relative to the first link member.

According to the structure described above, the inflected piece is formed at the lower portion of the second link member. The inflected piece is inflected toward the seat width direction from the front end side of the lower portion of the second link member. The inflected piece is disposed to the front side in the seat front-rear direction relative to the distal end portion of the first link member. When the coupling mechanism is in the second coupling state, the inflected piece abuts against the distal end portion of the first link member and limits turning of the second link member relative to the first link member. Therefore, with a simple structure, turning of the second link member may be limited at a suitable position.

In a vehicle seat according to a sixth aspect of the present disclosure, in the structure of the second aspect: the second link member forms an inverted "V" shape in a seat side view; a lower portion of a seat front-rear direction front side of the second link member is coupled to the distal end portion of the first link member, so as to be turnable around the axis in the seat width direction; an upper portion of the second link member is turnably coupled to the seat back frame via the reclining rod; and a catch portion is formed at a lower portion of a seat front-rear direction rear side of the second link member, the catch portion being incised from the front side in the seat front-rear direction, and the catch portion catching on the support rod when the coupling mechanism is in the first coupling state.

According to the structure described above, the second link member is formed in the inverted "V" shape in seat side view. The lower portion of the seat front-rear direction front side of the second link member is coupled to the distal end portion of the first link member, so as to be rotatable around the axis in the seat width direction. The upper portion of the second link member is turnably coupled to the seat back frame via the reclining rod. The catch portion is formed at a lower portion of the seat front-rear direction rear side of the second link member. The catch portion is incised into this lower portion from the front side in the seat front-rear direction. The catch portion catches on the support rod when the coupling mechanism is in the first coupling state. Consequently, movement of the reclining rod when the seat back is at the position supporting the back area of a seated vehicle occupant may be suppressed.

As described above, according to the vehicle seat of the present disclosure, an excellent effect is provided in that a rear face side of a seat back may be disposed horizontally when the seat back is tilted forward.

BRIEF DESCRIPTION OF THE DRAWINGS

An exemplary embodiment of the present disclosure will be described in detail based on the following figures, wherein.

DETAILED DESCRIPTION

Figure 1:
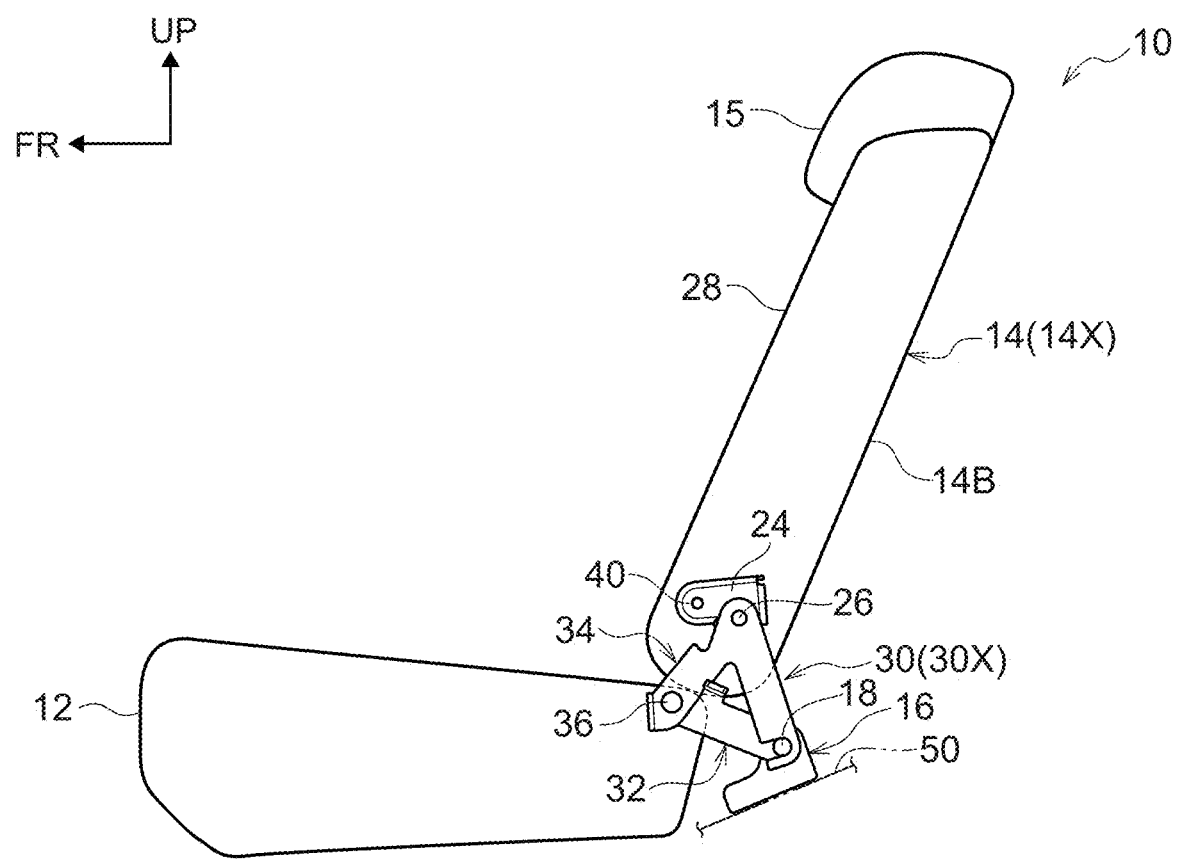
FIG. 1 is a side view showing a state in which a vehicle seat according to an exemplary embodiment of the present disclosure is at a usage position.

Below, a vehicle seat 10 according to a first exemplary embodiment of the present disclosure is described with reference to FIG. 1 to FIG. 11. An arrow FR that is shown where appropriate in the drawings indicates a vehicle front direction, an arrow UP indicates a vehicle upper direction, and an arrow W indicates a vehicle width direction (a seat left-right direction). In the drawings, some reference symbols may be omitted with a view to simplification of the drawings.

Structure of the Exemplary Embodiment

The vehicle seat 10 according to the present exemplary embodiment serves as, for example, a rear seat of a car. As shown in FIG. 1, the vehicle seat 10 is provided with a seat cushion 12 on which a vehicle occupant sits, a seat back 14 and a head rest 15. The seat back 14 is used for supporting the back area of the vehicle occupant sitting on the seat cushion 12 (below referred to where appropriate as the seated vehicle occupant). The head rest 15 is attached to an upper portion of the seat back 14 and is used for supporting the head area of the seated vehicle occupant.

The seat back 14 may be tilted forward (see FIG. 10) around reclining rods 26 that extend along the seat width direction. The reclining rods 26 are an element that may be understood as a hinge center of the seat back 14. In FIG. 1, a state of the seat back 14 is shown in which the seat back 14 is disposed at a usage position 14X, which is a position supporting the back area of the seated vehicle occupant.

Figure 3:
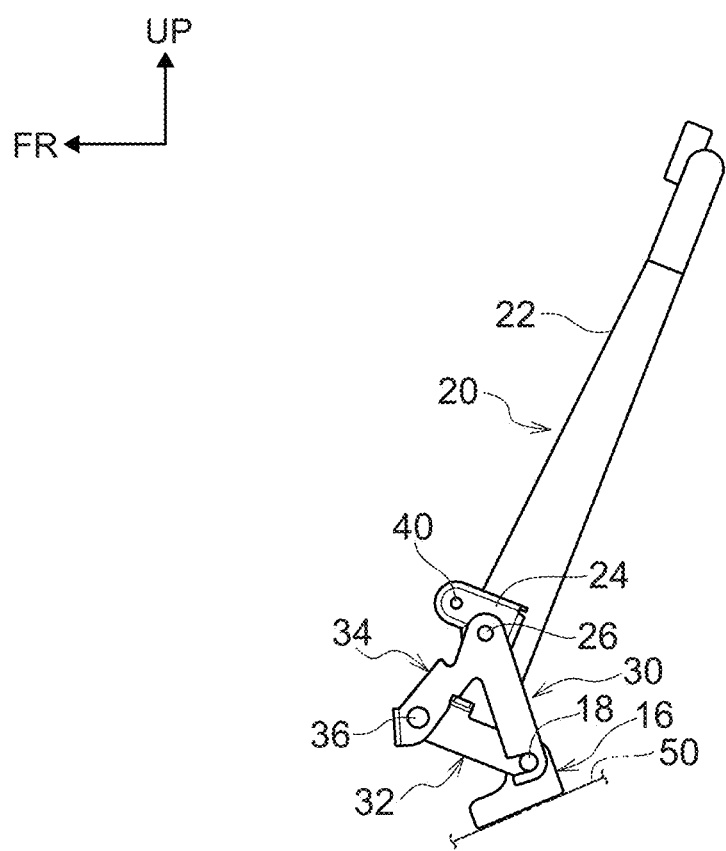
FIG. 3 is a side view showing a seat back frame and mechanism portions that are shown in FIG. 2.

The seat back 14 is equipped with a seat back frame 20, which is a framework member shown in FIG. 3. The seat back frame 20 includes a frame main body 22 that is formed in a substantially rectangular frame shape (not shown in the drawings) as seen in the front-rear direction of the seat back 14. Publicly known structures may be employed for the frame main body 22, so detailed descriptions of the frame main body 22 are not given here. Seat back springs, which are not shown in the drawings, are attached to the frame main body 22, and a seat back pad, which is not shown in the drawings, is supported at the frame main body 22. The seat back pad is covered by a seat cover 28 (see FIG. 1).

The seat back frame 20 includes a left and right pair of reclining brackets 24, which serve as a bracket, attached to lower end portion sides of portions at the seat width direction outer sides of the frame main body 22. In a seat side view, each reclining bracket 24 projects to the front side of the seat back 14 in the front-rear direction from a portion of the reclining bracket 24 that is attached to the frame main body 22. Respective reclining rods 26 are attached to the left and right pair of reclining brackets 24. Stopper pins 40, which serve as an abutting member, are also attached to the left and right pair of the reclining brackets 24. In a seat side view, each stopper pin 40 is attached to the reclining bracket 24 at the front-rear direction front side of the seat back 14 relative to the reclining rod 26. the stopper pin 40 extends in the seat width direction. A function of the stopper pin 40 is described below.

Figure 4:
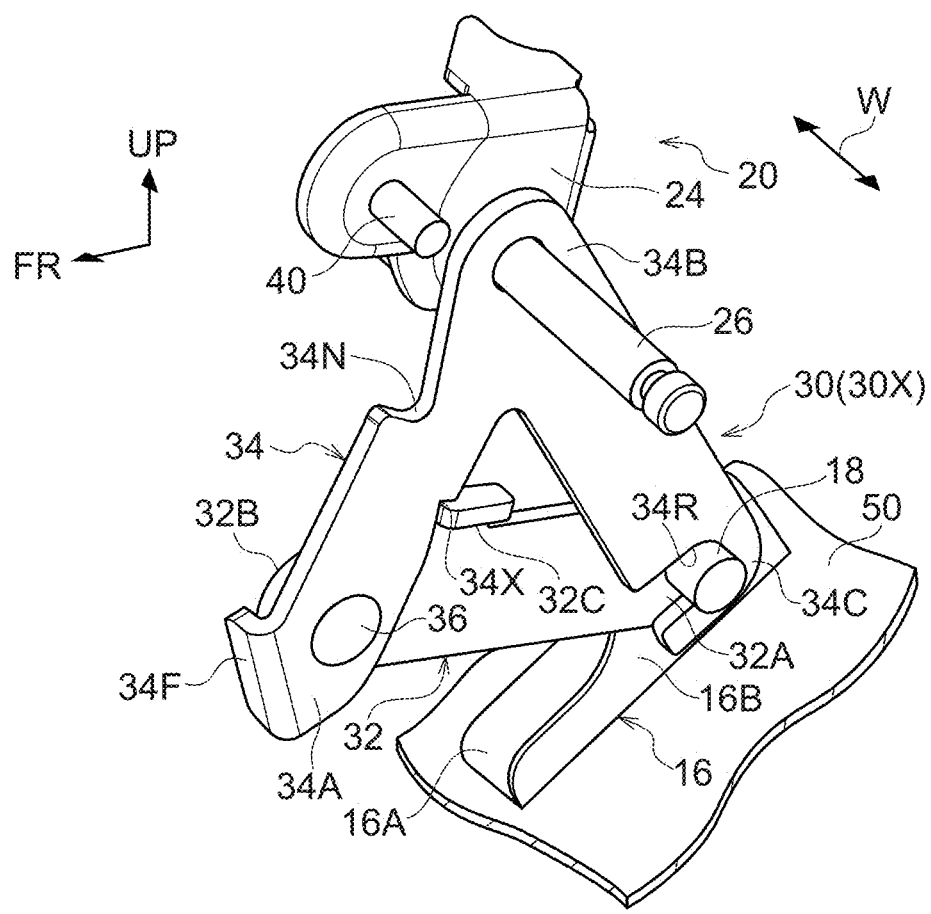
FIG. 4 is a perspective view showing a magnification of the coupling mechanism and surrounding portions in a first coupling state.

As shown in FIG. 1, the vehicle seat 10 is equipped with a support member 16, which is set at the seat lower-oblique-rear side relative to the reclining rod 26. As shown in FIG. 4, the support member 16 includes an attachment wall portion 16A and a vertical wall portion 16B. The attachment wall portion 16A is attached to an upper face side of a vehicle body floor part 50. The vertical wall portion 16B is inflected toward the upper side, projecting from a seat width direction outer side end of the attachment wall portion 16A. The vertical wall portion 16B of the support member 16 is penetrated through by a support rod 18 that extends along the seat width direction. The support rod 18 is supported at the vertical wall portion 16B of the support member 16, and is an element that may be understood as a vehicle fastening point. The vehicle seat 10 shown in FIG. 1 is further equipped with a coupling mechanism 30 that couples the support rod 18 with the reclining rod 26. The coupling mechanism 30 is provided in a pair at left and right of the vehicle seat 10.

Figure 2:
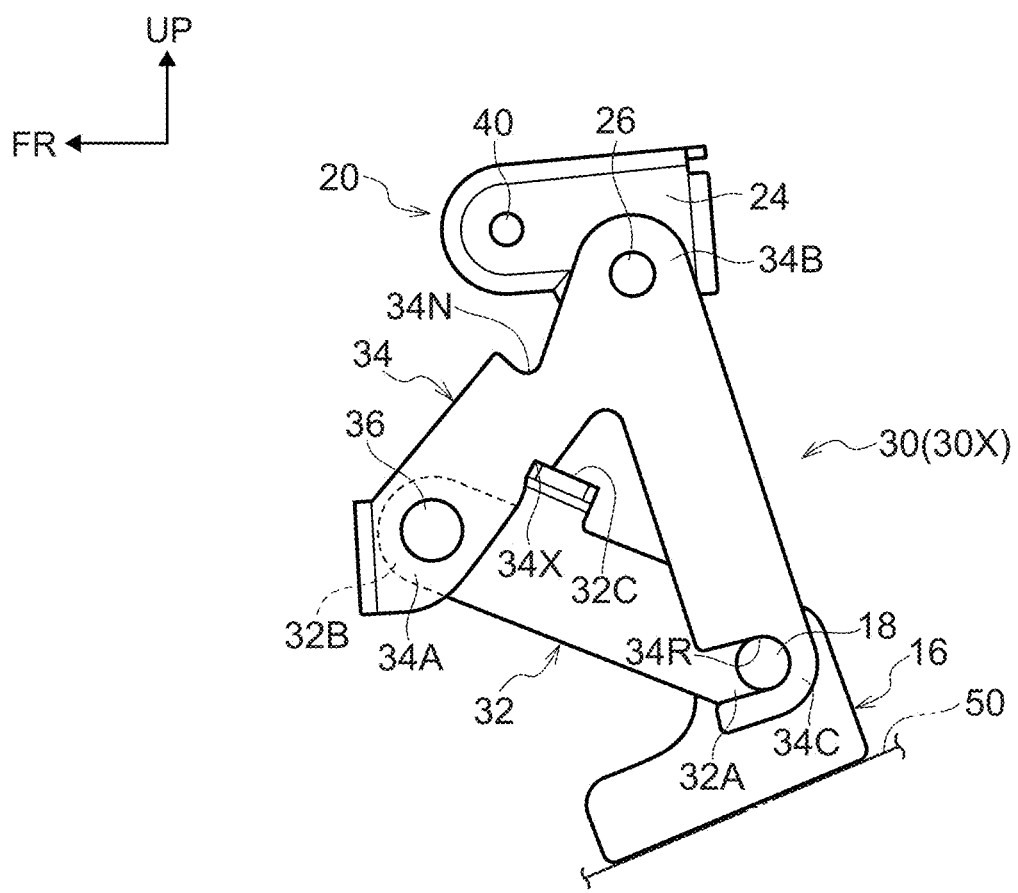
FIG. 2 is a side view showing a magnification of a coupling mechanism and surrounding portions when the coupling mechanism is in the state in FIG. 1.

FIG. 2 is a side view showing a magnification of one of the coupling mechanisms 30 and surrounding portions when in the state in FIG. 1. As shown in FIG. 2 and FIG. 4, the coupling mechanism 30 includes a first link member 32 and a second link member 34.

The first link member 32 is a member that may be understood as a link bracket. The first link member 32 is formed in a long, narrow shape of a plate metal material. A proximal end portion 32A of the first link member 32 is turnably coupled to the support member 16 via the support rod 18.

The second link member 34 is a member that may be understood as a link bracket. The second link member 34 is formed of a plate metal material and forms an inverted "V" shape in a seat side view. A lower portion 34A of a seat front-rear direction front side of the second link member 34 is turnably coupled to a distal end portion 32B of the first link member 32 via a link rod 36 that extends along the seat width direction (which is, for example, a stepped bolt and a nut). That is, the lower portion 34A of the seat front-rear direction front side of the second link member 34 is turnable relative to the distal end portion 32B of the first link member 32 around an axis in the seat width direction. An upper portion 34B of the second link member 34 is turnably coupled to the reclining bracket 24 of the seat back frame 20 via the reclining rod 26.

Figure 10:
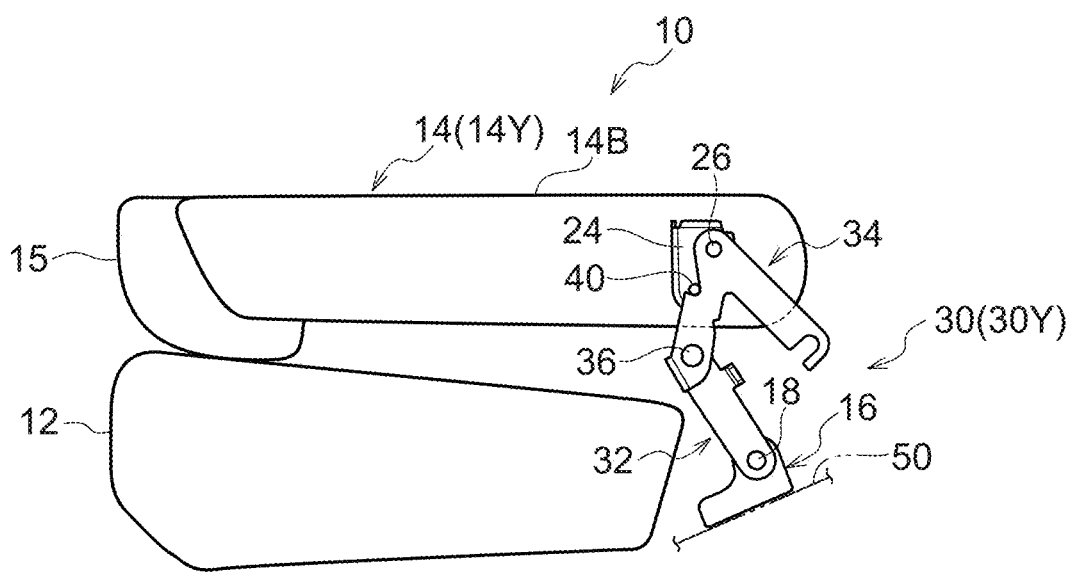
FIG. 10 is a side view showing a state in which the vehicle seat is at a forward-tilted position.
Figure 11:
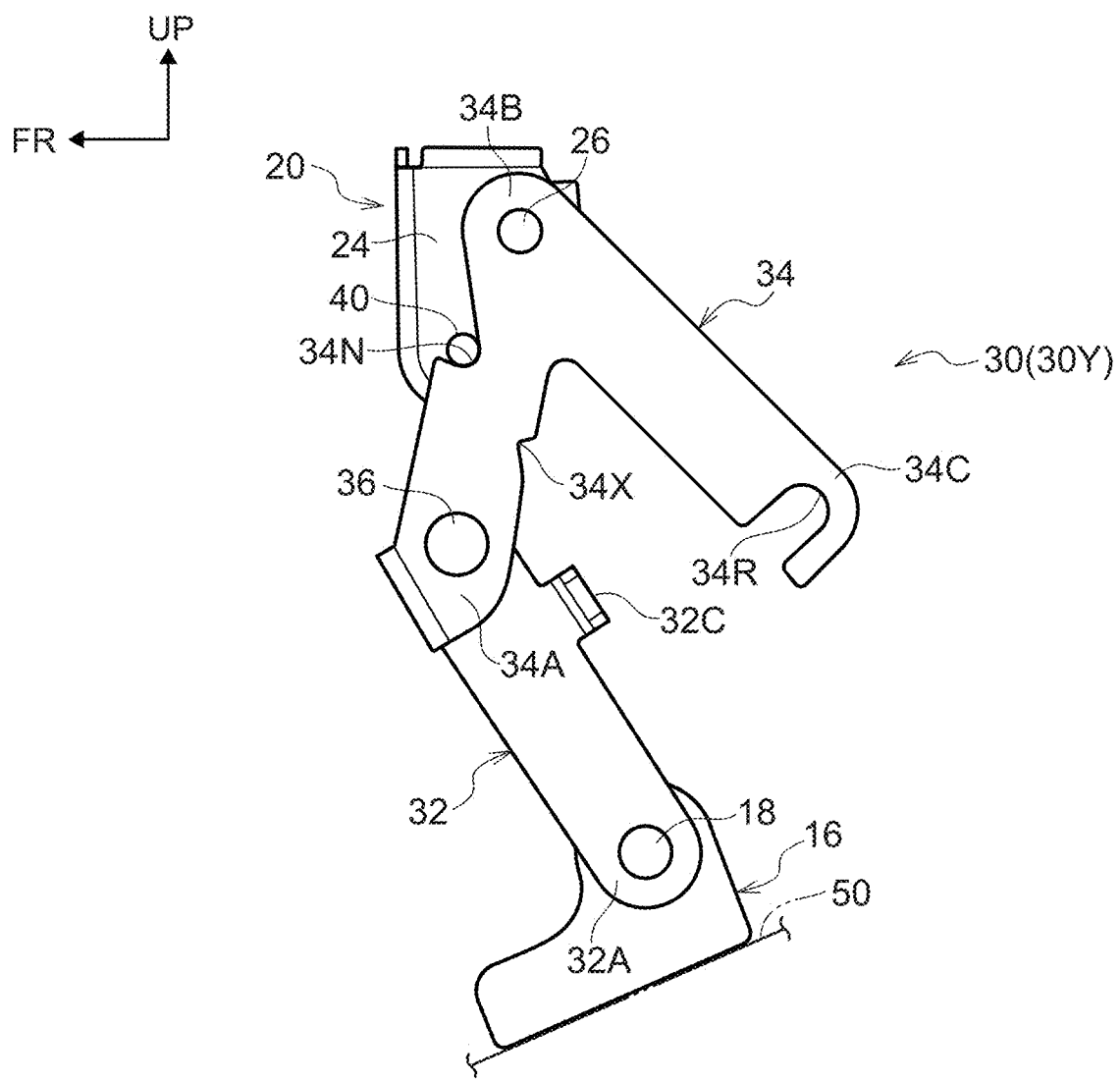
FIG. 11 is a side view showing a magnification of the coupling mechanism and surrounding portions when in the state in FIG. 10.

According to the above descriptions, the coupling mechanism 30 is capable of attaining a first coupling state 30X and a second coupling state 30Y. The first coupling state 30X is a coupling state when the seat back 14 is at a position (the usage position 14X) supporting the back area of the seated vehicle occupant, as illustrated in FIG. 1. The second coupling state 30Y is a coupling state when the seat back 14 is tilted forward and a rear face 14B of the seat back 14 is made horizontal (when the seat back 14 is set fully flat), as illustrated in FIG. 10. In a seat side view, a distance from the support rod 18 to the reclining rod 26 is longer when in the second coupling state 30Y than when in the first coupling state 30X (see FIG. 1). The respective distances in seat side view from the support rod 18 to the reclining rod 26 for the first coupling state 30X (see FIG. 1 and FIG. 2) and the second coupling state 30Y (see FIG. 10 and FIG. 11) are specified in accord with the shape of the vehicle seat 10 (see FIG. 1 and the like). Turning of the second link member 34 relative to the first link member 32 is locked by, for example, a locking mechanism that is not shown in the drawings. The second coupling state 30Y of the coupling mechanism 30 may be maintained by this locking mechanism locking turning of the second link member 34 relative to the first link member 32. A publicly known locking mechanism may be employed as the locking mechanism.

Figure 5:
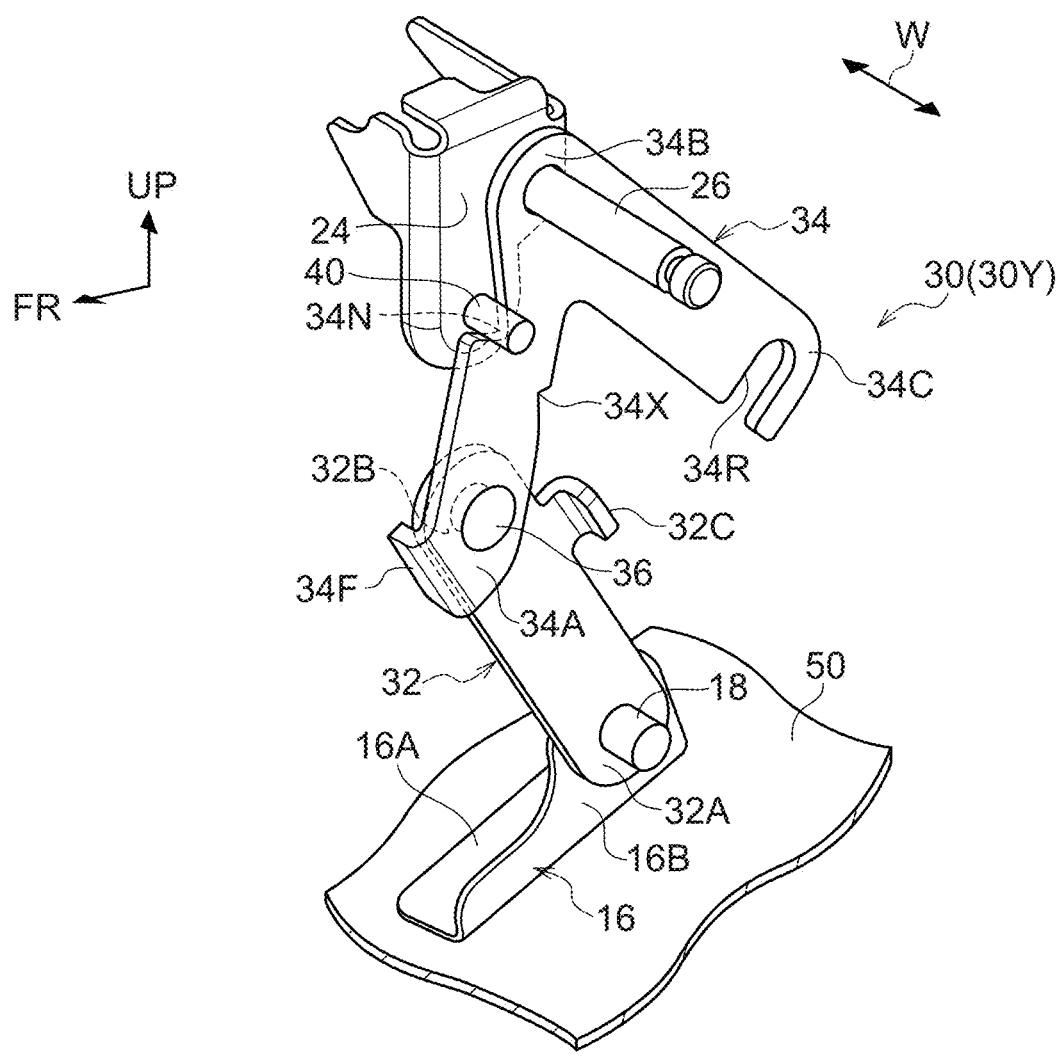
FIG. 5 is a perspective view showing a magnification of the coupling mechanism and surrounding portions in a second coupling state.

As shown in FIG. 4, an inflected piece 34F is formed at the lower portion 34A of the seat front-rear direction front side of the second link member 34. The inflected piece 34F is inflected toward the seat width direction from the front end side of the lower portion 34A and is disposed at the front side in the seat front-rear direction relative to the distal end portion 32B of the first link member 32. As shown in FIG. 5, when the coupling mechanism 30 is in the second coupling state 30Y, the inflected piece 34F abuts against a front end face of the distal end portion 32B of the first link member 32 and limits turning of the second link member 34 relative to the first link member 32.

A catch portion 34R is formed at a lower portion 34C of the seat front-rear direction rear side of the second link member 34. The catch portion 34R is incised into the lower portion 34C from the front side in the seat front-rear direction. As shown in FIG. 4, the catch portion 34R is formed so as to catch (hook) on the support rod 18 when the coupling mechanism 30 is in the first coupling state 30X.

Figure 6:
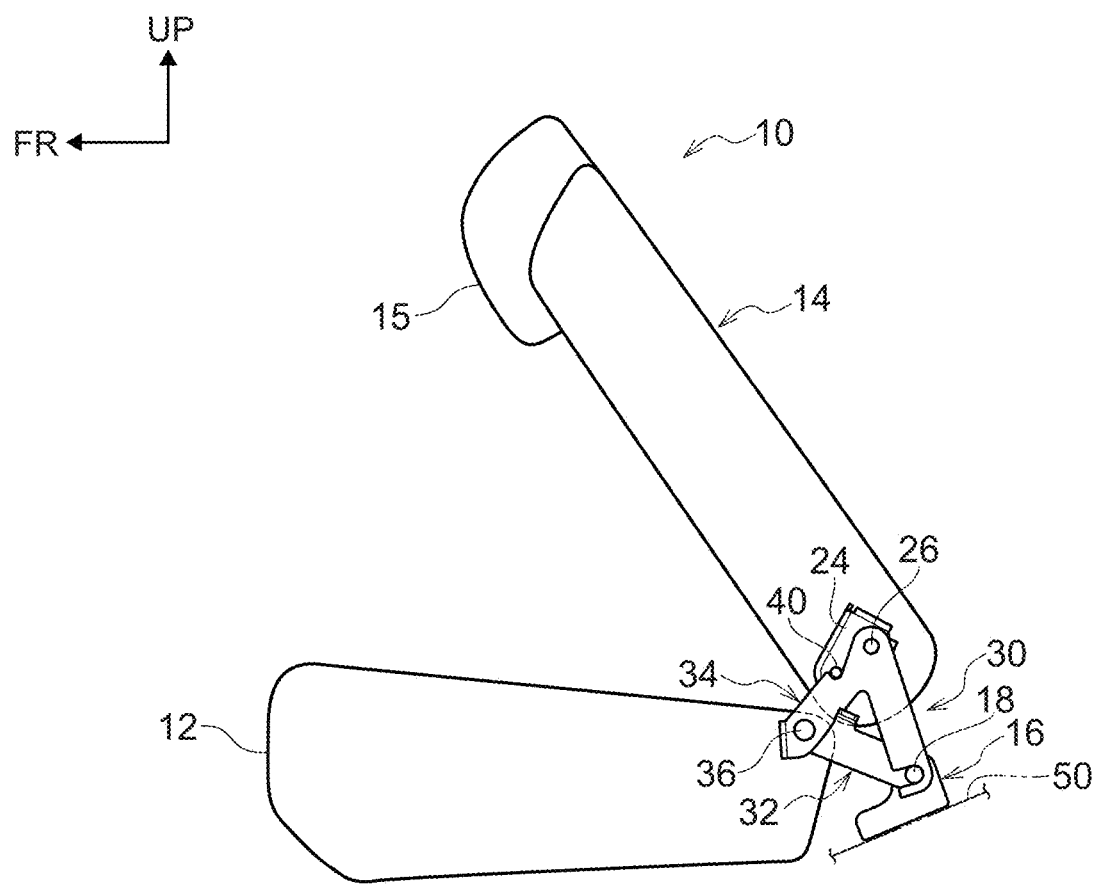
FIG. 6 is a side view showing a state in a former half of a forward-tilting process of the vehicle seat.
Figure 7:
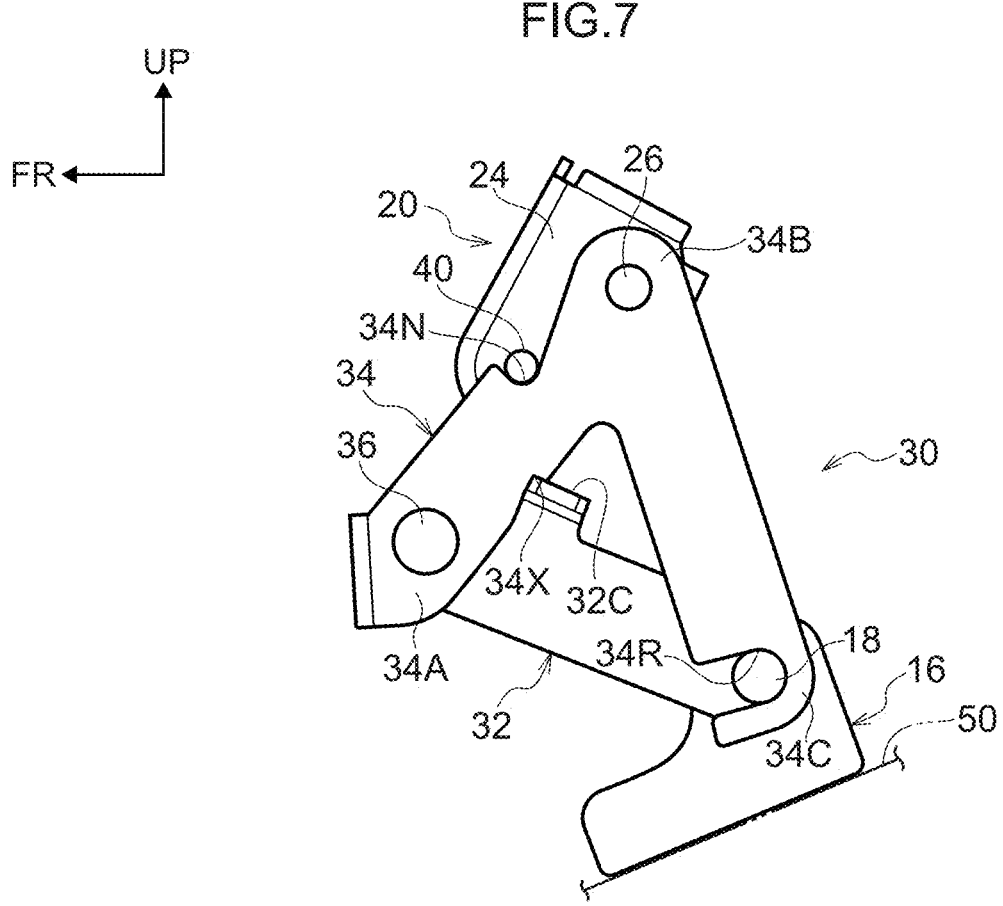
FIG. 7 is a side view showing a magnification of the coupling mechanism and surrounding portions when in the state in FIG. 6.
Figure 8:
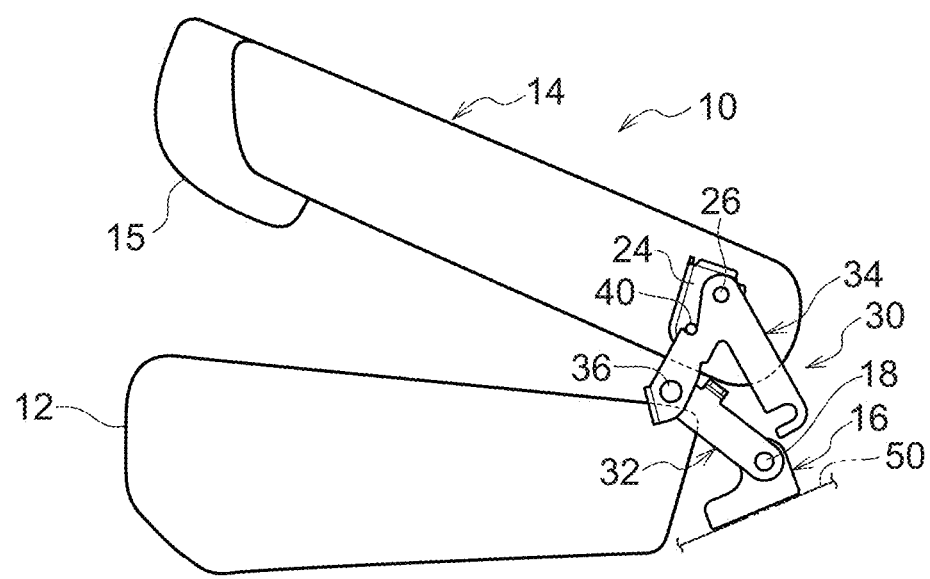
FIG. 8 is a side view showing a state in a latter half of the forward-tilting process of the vehicle seat.
Figure 9:
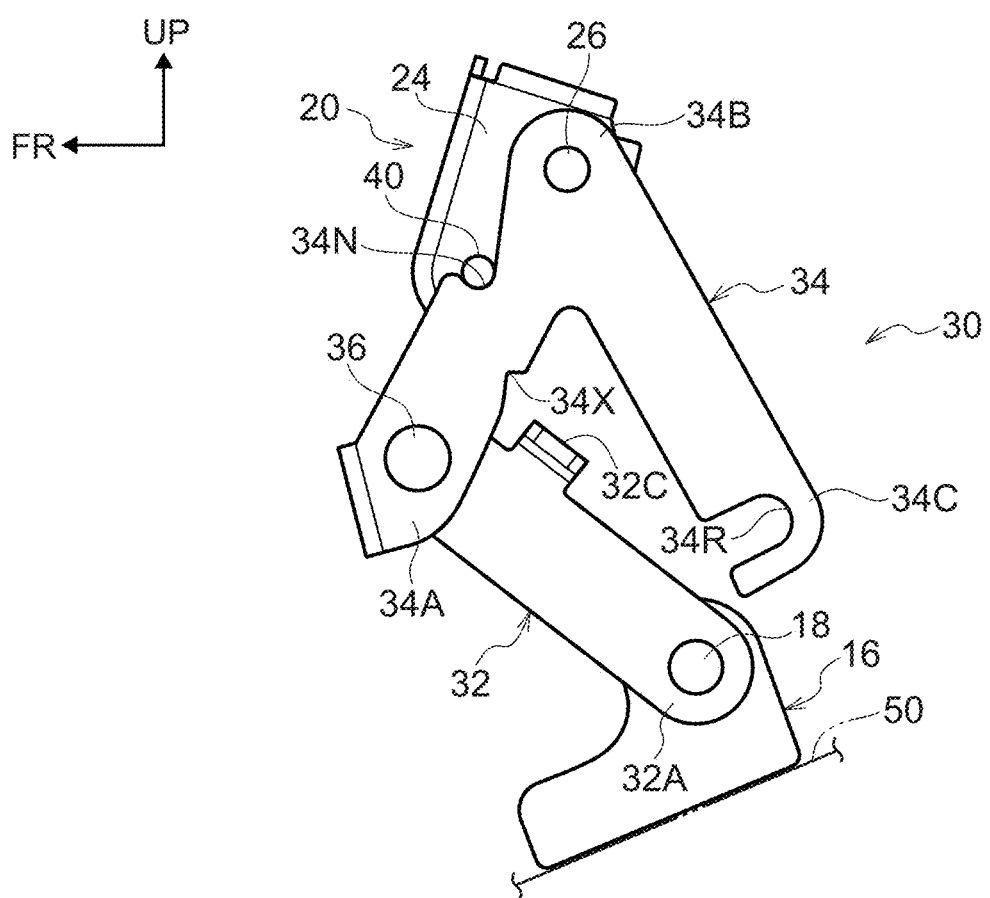
FIG. 9 is a side view showing a magnification of the coupling mechanism and surrounding portions when in the state in FIG. 8.

FIG. 6 is a side view showing a state in a former half of a forward-tilting process of the vehicle seat 10, and FIG. 7 is a side view showing a magnification of the coupling mechanism 30 and surrounding portions when in the state in FIG. 6. FIG. 8 is a side view showing a state in a latter half of the forward-tilting process of the vehicle seat 10, and FIG. 9 is a side view showing a magnification of the coupling mechanism 30 and surrounding portions when in the state in FIG. 8. As is shown in FIG. 6 to FIG. 9, the stopper pin 40 attached to the reclining bracket 24 described above is structured such that, when the seat back 14 is turned in the direction of tilting forward (see FIG. 6 and FIG. 8), the stopper pin 40 abuts against the second link member 34 partway through turning of the seat back 14.

This matter is now described in more detail. As shown in FIG. 7 and FIG. 9, a notch portion 34N is formed at an upper portion of a region of the seat front-rear direction front side of the second link member 34. In a seat side view, the notch portion 34N is incised from the front side in the seat front-rear direction. The notch portion 34N is formed such that, when the seat back 14 (see FIG. 6 and FIG. 8) is turned in the direction of tilting forward, the stopper pin 40 abuts against the notch portion 34N from the front side in the seat front-rear direction and the upper side in the seat vertical direction partway through turning of the seat back 14.

As shown in FIG. 5, a recess portion 34X is formed at the front side in the seat front-rear direction of a region at the inner side of the inverted "V" shape of the second link member 34. The recess portion 34X is incised from the rear side in the seat front-rear direction. Correspondingly, a projecting inflection portion 32C is formed at an upper portion of the first link member 32. The projecting inflection portion 32C is formed at a region of the first link member 32 that is disposed inside the inverted "V" shape of the second link member 34 in a seat side view. The projecting inflection portion 32C projects from one of long side portions of the first link member 32 (a rear side in the seat front-rear direction in FIG. 5) and is inflected toward the seat width direction. As shown in FIG. 4, a portion of the projecting inflection portion 32C is formed so as to abut against the recess portion 34X when the coupling mechanism 30 is in the first coupling state 30X.

Operation and Effects of the Exemplary Embodiment

Now, operation and effects of the present exemplary embodiment are described.

In the present exemplary embodiment, the seat back 14 in the state at the usage position 14X shown in FIG. 1 is tiltable forward around the reclining rods 26 that extend along the seat width direction. The support rods 18 that extend along the seat width direction are supported at the support members 16 attached to the vehicle body floor part 50. The support rods 18 and reclining rods 26 are coupled by the coupling mechanisms 30. Each coupling mechanism 30 is capable of attaining the first coupling state 30X, which is the coupling state when the seat back 14 is at the usage position 14X supporting the back area of the seated vehicle occupant, and the second coupling state 30Y, which is the coupling state when the seat back 14 is tilted forward and the rear face 14B of the seat back 14 is made horizontal as shown in FIG. 10, and the distance from the support rod 18 to the reclining rod 26 in a seat side view is longer than when the coupling mechanism 30 is in the first coupling state 30X (see FIG. 1). Therefore, when the seat back 14 is tilted forward, the distance from each support rod 18 to the reclining rod 26 may be lengthened, and the seat back 14 may be tilted forward such that a position of the reclining rod 26 is raised and the rear face 14B of the seat back 14 is made horizontal (that is, the seat back 14 is disposed at the tilted-forward position 14Y illustrated in FIG. 10).

In the present exemplary embodiment, as shown in FIG. 2 and the like, the coupling mechanism 30 includes the first link member 32 and the second link member 34. The proximal end portion 32A of the first link member 32 is turnably coupled to the support member 16 via the support rod 18. The second link member 34 is turnably coupled to the distal end portion 32B of the first link member 32 to be rotatable around an axis in the seat width direction, and is turnably coupled to the seat back frame 20 via the reclining rod 26. Therefore, even with a simple structure, the coupling mechanism 30 is capable of attaining the first coupling state 30X shown in FIG. 2 and the second coupling state 30Y shown in FIG. 11.

In the present exemplary embodiment, the reclining rod 26 and the stopper pin 40 are attached to each reclining bracket 24 attached to the frame main body 22 of the seat back frame 20, which is shown in FIG. 3. The stopper pin 40 extends in the seat width direction and, when the seat back 14 is turned in the direction of tilting forward as shown in FIG. 6 and FIG. 8, abuts against the second link member 34 as shown in FIG. 7 and FIG. 9 partway through turning of the seat back 14. Therefore, when a vehicle occupant is turning the seat back 14 in the direction of tilting forward in the sequence of FIG. 6 and FIG. 8, the stopper pin 40 may press against the second link member 34 as shown in FIG. 7 and FIG. 9, facilitating lifting of the position of the reclining rod 26 and setting of the coupling mechanism 30 to the second coupling state 30Y (see FIG. 11).

In the present exemplary embodiment, when the seat back 14 is turned in the direction of tilting forward as shown in FIG. 6 and FIG. 8, the stopper pin 40 abuts against the notch portion 34N of the second link member 34 from the front side in the seat front-rear direction and the upper side in the seat vertical direction partway through turning of the seat back 14, as shown in FIG. 7 and FIG. 9. Therefore, while a vehicle occupant is turning the seat back 14 in the direction of tilting forward in the sequence of FIG. 6, FIG. 8 and FIG. 10, when the side of the seat back 14 at which the reclining rods 26 are disposed acts to lift upward, the stopper pin 40 shown in FIG. 7, FIG. 9 and FIG. 11 may receive a reaction force toward the seat upper side from the second link member 34. Therefore, the vehicle occupant may lift up the side of the seat back 14 at which the reclining rods 26 are disposed as shown in FIG. 10 with a small force.

In the present exemplary embodiment, as shown in FIG. 4, the inflected piece 34F that is inflected toward the seat width direction from the front end side of the lower portion of the second link member 34 is formed at this lower portion. The inflected piece 34F is disposed at the front side in the seat front-rear direction relative to the distal end portion 32B of the first link member 32. As shown in FIG. 5, when the coupling mechanism 30 is in the second coupling state 30Y, the inflected piece 34F abuts against the front end face of the distal end portion 32B of the first link member 32 and limits turning of the second link member 34 relative to the first link member 32. Therefore, with a simple structure, turning of the second link member 34 may be limited at a suitable position.

As described above, according to the vehicle seat 10 according to the present exemplary embodiment, when the seat back 14 is tilted forward as shown in FIG. 10, the rear face 14B side of the seat back 14 may be disposed horizontally.

When the seat back 14 of the vehicle seat 10 that is a rear seat is tilted forward and the rear face 14B side of the seat back 14 can be disposed horizontally, a space at the upper side thereof may be more effectively utilized as a front side luggage compartment.

In the present exemplary embodiment, as shown in FIG. 2, the second link member 34 forms the inverted "V" shape in seat side view. The lower portion 34A of the seat front-rear direction front side of this second link member 34 is coupled to the distal end portion 32B of the first link member 32, so as to be turnable around an axis in the seat width direction. The upper portion 34B of the second link member 34 is turnably coupled to the reclining bracket 24 of the seat back frame 20 via the reclining rod 26. In the lower portion 34C of the seat front-rear direction rear side of this second link member 34, the catch portion 34R that is incised from the front side in the seat front-rear direction is formed. The catch portion 34R catches on the support rod 18 when the coupling mechanism 30 is in the first coupling state 30X. Consequently, when the seat back 14 is at the usage position 14X supporting the back area of the seated vehicle occupant (see FIG. 1), movement of the reclining rod 26 may be suppressed.

Supplementary Descriptions of the Exemplary Embodiment

In the exemplary embodiment described above as illustrated in FIG. 1 to FIG. 11, the coupling mechanism 30 is a structure that includes the first link member 32 and the second link member 34. However, a structure is also possible in which, for example, a support rod (18) and a reclining rod (26) are directly coupled in a seat side view and a variable mechanism capable of varying a distance from the support rod (18) to the reclining rod (26) is included, as a result of which the structure is capable of attaining a first coupling state, which is a coupling state when a seat back (14) is at a position supporting the back area of a seated vehicle occupant, and a second coupling state, which is a coupling state in which the seat back (14) is tilted forward, a rear face (14B) is made horizontal, and the distance from the support rod (18) to the reclining rod (26) in the seat side view is longer than in the first coupling state.

In the exemplary embodiment described above, the stopper pin 40 that serves as an abutting member is attached to the reclining bracket 24. However, as a variant example of the exemplary embodiment described above, the stopper pin 40 may be not provided and a separate mechanism may be provided that, when a seat back (14) is being turned in the direction of tilting forward, disables relative displacement of a second link member (34) with respect to a seat back frame (20) partway through turning of the seat back (14).

In the exemplary embodiment described above, the notch portion 34N is formed in the second link member 34 (see FIG. 2 and the like). However, as a variant example of the exemplary embodiment described above, a structure may be employed in which a notch portion (34N) is not formed in a second link member (34).

In the exemplary embodiment described above, the inflected piece 34F is formed at the second link member 34 (see FIG. 5 and the like). However, as a variant example of the exemplary embodiment described above, the inflected piece 34F may be not provided at the second link member 34 and a stopper may be separately provided for limiting turning of a second link member (34) relative to a first link member (32) when a coupling mechanism (30) is in a second coupling state (30Y).

In the exemplary embodiment described above, the catch portion 34R is formed at the lower portion 34C of the seat front-rear direction rear side of the second link member 34. However, as a variant example of the exemplary embodiment described above, the catch portion 34R may be not provided at the second link member 34 and, for example, a separate locking mechanism may be provided that locks a second link member (34) at a lower portion of a first link member (32) or at a support member (16) when a coupling mechanism (30) is in a first coupling state (30X).

As a further variant example of the exemplary embodiment described above, a support member supporting a support rod (18) may be a portion of a seat cushion frame.

The exemplary embodiment described above and the numerous variant examples mentioned above may be embodied in suitable combinations.

Above, examples of the present disclosure have been described, but the present disclosure is not limited by these descriptions and it will be clear that numerous modifications beyond these descriptions may be embodied within a technical scope not departing from the gist of the invention.

What is claimed is:

1. A vehicle seat, comprising:
   a seat cushion;
   a seat back for supporting a back area of a vehicle occupant seated on the seat cushion, the seat back being tiltable forward, around a reclining rod that extends along a seat width direction;
   a support rod that extends along the seat width direction, the support rod being supported at a support member that is attached to a vehicle body floor part; and
   a coupling mechanism that couples the support rod with the reclining rod, the coupling mechanism being configured to attain a first coupling state and a second coupling state,
   the first coupling state being a coupling state when the seat back is at a position supporting the back area of the seated vehicle occupant, and
   the second coupling state being a coupling state when the seat back is tilted forward and a rear face of the seat back is made horizontal, a distance from the support rod to the reclining rod in a seat side view being longer in the second coupling state than in the first coupling state,
   wherein the coupling mechanism comprises:
      a first link member, a proximal end portion of which is turnably coupled to the support member via the support rod; and
      a second link member that is coupled to a distal end portion of the first link member to be turnable around an axis in the seat width direction and that is turnably coupled to a seat back frame of the seat back via the reclining rod,
   wherein the seat back frame comprises:
      a frame main body; and
      a bracket that is attached to a lower end portion side of the frame main body, the reclining rod being attached to the bracket; and
      an abutting member is attached to the bracket, the abutting member extending in the seat width direction and, when the seat back is turned in a direction of tilting forward, the abutting member abutting against the second link member partway through turning of the seat back.

2. The vehicle seat according to claim 1, wherein:
   a notch portion is formed in a region of a seat front-rear direction front side of the second link member, the notch portion being incised from the front side in the seat front-rear direction in a seat side view; and
   the notch portion is formed such that, partway through turning of the seat back when the seat back is turned in the direction of tilting forward, the abutting member abuts against the notch portion from the front side in the seat front-rear direction and the upper side in a seat vertical direction.

3. A vehicle seat, comprising:
   a seat cushion;
   a seat back for supporting a back area of a vehicle occupant seated on the seat cushion, the seat back being tiltable forward, around a reclining rod that extends along a seat width direction;
   a support rod that extends along the seat width direction, the support rod being supported at a support member that is attached to a vehicle body floor part; and a coupling mechanism that couples the support rod with the reclining rod, the coupling mechanism being configured to attain a first coupling state and a second coupling state, the first coupling state being a coupling state when the seat back is at a position supporting the back area of the seated vehicle occupant, and the second coupling state being a coupling state when the seat back is tilted forward and a rear face of the seat back is made horizontal, a distance from the support rod to the reclining rod in a seat side view being longer in the second coupling state than in the first coupling state wherein the coupling mechanism comprises:
- a first link member, a proximal end portion of which is turnably coupled to the support member via the support rod; and
- a second link member that is coupled to a distal end portion of the first link member to be turnable around an axis in the seat width direction and that is turnably coupled to a seat back frame of the seat back via the reclining rod, wherein an inflected piece is formed at a lower portion of the second link member, wherein the inflected piece:
- is inflected toward the seat width direction from a front end side of the lower portion of the second link member;
- is disposed at the front side in the seat front-rear direction relative to the distal end portion of the first link member; and
- when the coupling mechanism is in the second coupling state, abuts against the distal end portion of the first link member and limits turning of the second link member relative to the first link member.

4. A vehicle seat, comprising:

a seat cushion;

a seat back for supporting a back area of a vehicle occupant seated on the seat cushion, the seat back being tiltable forward, around a reclining rod that extends along a seat width direction;

a support rod that extends along the seat width direction, the support rod being supported at a support member that is attached to a vehicle body floor part; and a coupling mechanism that couples the support rod with the reclining rod, the coupling mechanism being configured to attain a first coupling state and a second coupling state, the first coupling state being a coupling state when the seat back is at a position supporting the back area of the seated vehicle occupant, and the second coupling state being a coupling state when the seat back is tilted forward and a rear face of the seat back is made horizontal, a distance from the support rod to the reclining rod in a seat side view being longer in the second coupling state than in the first coupling state, wherein the coupling mechanism comprises:
- a first link member, a proximal end portion of which is turnably coupled to the support member via the support rod; and
- a second link member that is coupled to a distal end portion of the first link member to be turnable around an axis in the seat width direction and that is turnably coupled to a seat back frame of the seat back via the reclining rod, wherein:
- the second link member forms an inverted "V" shape in a seat side view;
- a lower portion of a seat front-rear direction front side of the second link member is coupled to the distal end portion of the first link member, so as to be turnable around the axis in the seat width direction;
- an upper portion of the second link member is turnably coupled to the seat back frame via the reclining rod; and
- a catch portion is formed at a lower portion of a seat front-rear direction rear side of the second link member, the catch portion being incised from the front side in the seat front-rear direction, and the catch portion catching on the support rod when the coupling mechanism is in the first coupling state.

* * * * *